B. B. WALLACE.
WHEELED PLOW.
APPLICATION FILED AUG. 16, 1916.
1,303,427.
Patented May 13, 1919.
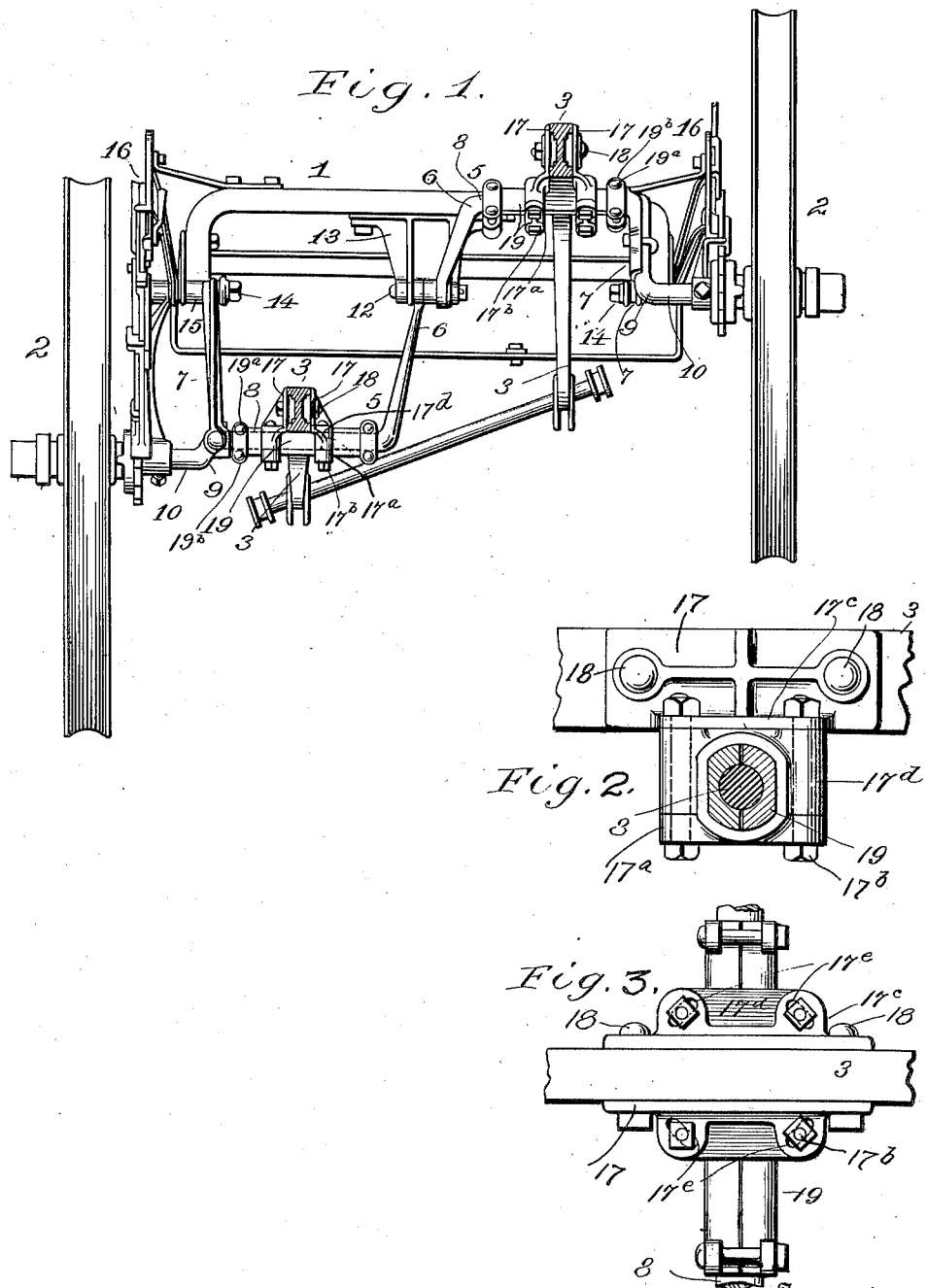

UNITED STATES PATENT OFFICE.

BENJAMIN B. WALLACE, OF POUGHKEEPSIE, NEW YORK, ASSIGNOR TO MOLINE PLOW COMPANY, A CORPORATION OF ILLINOIS.

WHEELED PLOW.

1,303,427.     Specification of Letters Patent.     Patented May 13, 1919.

Original application filed February 12, 1915, Serial No. 7,669. Divided and this application filed August 16, 1916. Serial No. 115,130.

*To all whom it may concern:*

Be it known that I, BENJAMIN B. WALLACE, a citizen of the United States, residing at Poughkeepsie, in the county of Dutchess and State of New York, have invented certain new and useful Improvements in Wheel-Plows, of which the following is a specification, reference being had therein to the accompanying drawing.

This invention relates to wheel plows and has reference more particularly to that type of plow comprising a frame supported by ground wheels and carrying plow beams suspended from the frame by swinging bails, which bails are adjustable up and down to raise and lower the plows respectively out of and into action.

The invention consists in improved means for connecting the plow beams to the bails in order to admit of various adjustments of the beams thereon, which improved means will be fully described in the specification to follow and the novel parts of which will be defined in the claim.

In the accompanying drawings while my improvements are shown as embodied in a two-way plow it is not confined in its application to such plow but is applicable to other forms of plows and wherever the adjustment of the beams relative to the supporting parts is desirable.

In the accompanying drawings:

Figure 1 is a rear elevation of a plow, with certain parts in section, showing my invention embodied therein.

Fig. 2 is a sectional elevation on an enlarged scale of the beam connecting means.

Fig. 3 is a top plan view of the parts shown in Fig. 2.

Referring to the drawings:

1 indicates the frame of the machine supported at opposite sides by ground wheels 2, 2 and giving support to two fore and aft extending plow beams 3, 3 equipped with moldboard plows 4 which point in the same direction but face respectively in opposite directions, this arrangement being characteristic of "two-way" plows. The plow beams are connected in the manner to be more fully described hereinafter, with swinging bails 5, 5 comprising each an inner arm 6, an outer arm 7 parallel therewith, and a horizontal transverse connecting arm 8, which latter is extended at its outer end forwardly as at 9, and then transversely outwardly in the form of a wheel spindle 10 on which the spindles of the two bails, the ground wheels 2, 2 are journaled. The upper ends of the inner arms 6 of the bails are journaled on a horizontal transverse pivot bolt 12 sustained by an arm or bracket 13 depending from the center of the frame, while the upper ends of the outer arms 7 are journaled respectively on transverse pivot bolts 14, 14 sustained by supporting lugs 15, 15 fixed to the frame of the machine, the axes of the said pivot bolts 12 and 14 being coincident so that in the swinging movements of the bails about such axes, the plow beams and ground wheels will be moved up and down.

The bails are adapted to be adjusted or swung independently of each other on these axes and are held in their adjusted positions by independent lever mechanisms 16, one for each bail, so that one beam and its associated wheel may be raised and held raised as shown in Fig. 1 and the other beam and its wheel lowered as usual in plows of this type.

Each beam is connected with the horizontal arm of its supporting bail in such manner that the beam may be adjusted on the arm transversely to vary the distance between the plows, and may be adjusted also in a horizontal plane about an upright axis to vary the inclination of the plows relative to the line of travel. These adjustments are provided for by means of the construction shown more particularly in Figs. 2 and 3, where it will be seen that the beam is clamped firmly and fixedly between opposing longitudinally extending cheek plates 17, 17 by means of transverse bolts 18 extending through the plates and beam. The cheek plates are each formed in two sections, an upper section $17^c$ carrying the vertical cheek plates proper, and a lower section $17^d$. The lower sections are provided in their lower edges respectively, with transversely extending sockets which receive a bearing sleeve 19 on the arm 8 of the bail. The cheek plates are fastened to the sleeve by means of fastening bolts $17^b$ which extend upwardly through the cap plates $17^a$, the lower sections of the cheek plates, and through arcuate slots $17^e$ in horizontal flanges on the upper sections of the cheek plates, which flanges are flat on their under sides and are seated on the flat upper ends of the lower sections of the cheek plates. These bolts thus serve to secure the cap plates and the two sections of the cheek plates together on the sleeve 19. By loosening the bolts, the cheek plates and connected plow beam may be adjusted transversely on the bearing sleeve and held in its adjusted position by again tightening up the fastening bolts.

The several arcuate slots in the flanges of the upper sections of the cheek plates extend in curves struck from a common center, the result being that the beam clamped between the upper sections of the cheek plates, may be adjusted in a horizontal plane on the lower sections of the cheek plates about said common axis, and may be held fixedly in its adjusted position by tightening up the fastening bolts. By this means the beams may be set at varying angles relatively to the bails in order to vary the inclination of the plows to the line of travel; and also the beams may be adjusted to and from each other along the bearing sleeves to vary the distance between the beams.

In the foregoing construction and in the accompanying drawings I have set forth my invention in the particular detailed form and construction which I prefer to adopt. It will be manifest, however, that various changes may be made in the details without departing from the limits of the invention; and it will be understood that the invention is not limited to any particular form or construction of the parts except in so far as such limitations are specified in the claim.

Having thus described my invention, what I claim is:

In a plow beam, the combination of a frame, a swinging bail mounted thereon and provided with a transverse supporting arm, a bearing sleeve of non-circular form in cross section loosely mounted on the supporting arm, a fore and aft extending plow beam, cheek plates applied to the opposite sides of the beam and comprising each an upper section having a horizontal flange formed with arcuate slots, and a flat under side, and a lower section with a flat upper side seated against the under side of the flange, said lower sections of the cheek plates being formed with sockets in which the bearing sleeve fits, cap plates applied to the lower sections over the sockets to confine the sleeve therein, and through bolts extending through the cap plates, the lower sections of the cheek plates, and the arcuate slots in the upper sections, and serving to connect said parts together; whereby the beam may be adjusted relatively to the supporting arm about a vertical axis and may be adjusted also lengthwise of said arm.

In testimony whereof, I have affixed my signature in presence of two witnesses.

BENJAMIN B. WALLACE.

Witnesses:
Wm. J. Merkle,
G. H. Michaelis.